US011281210B2

(12) United States Patent
Pfaff

(10) Patent No.: US 11,281,210 B2
(45) Date of Patent: Mar. 22, 2022

(54) OBJECT DETECTION EXTERNAL TO VEHICLE

(71) Applicant: Clark Equipment Company, West Fargo, ND (US)

(72) Inventor: John Pfaff, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 260 days.

(21) Appl. No.: 16/533,408

(22) Filed: Aug. 6, 2019

(65) Prior Publication Data

US 2020/0041999 A1 Feb. 6, 2020

Related U.S. Application Data

(60) Provisional application No. 62/715,017, filed on Aug. 6, 2018.

(51) Int. Cl.
| | | |
|---|---|---|
| *G05D 1/00* | (2006.01) | |
| *B60Q 1/08* | (2006.01) | |
| *E02F 9/20* | (2006.01) | |
| *E02F 3/34* | (2006.01) | |
| *E02F 9/26* | (2006.01) | |

(52) U.S. Cl.
CPC ........... *G05D 1/0055* (2013.01); *B60Q 1/085* (2013.01); *E02F 3/3414* (2013.01); *E02F 9/2004* (2013.01); *E02F 9/262* (2013.01); *G05D 2201/0202* (2013.01)

(58) Field of Classification Search
CPC ......... G05D 1/0055; G05D 2201/0202; B60Q 1/085; E02F 9/2004; E02F 3/3414; E02F 9/262; E02F 9/2033; E02F 9/2253
See application file for complete search history.

(56) References Cited

U.S. PATENT DOCUMENTS

| | | | | | |
|---|---|---|---|---|---|
| 5,463,384 | A | * | 10/1995 | Juds | ........................ G01S 17/04 340/903 |
| 6,853,328 | B1 | * | 2/2005 | Guice | ................... A01M 1/026 342/22 |
| 2009/0243822 | A1 | * | 10/2009 | Hinninger | .............. B60Q 9/008 340/435 |
| 2009/0306822 | A1 | * | 12/2009 | Augenbraun | .......... G05D 1/024 700/245 |
| 2010/0245542 | A1 | | 9/2010 | Kim et al. | |
| 2011/0080277 | A1 | * | 4/2011 | Traylor | ................... G01S 7/481 340/435 |

(Continued)

FOREIGN PATENT DOCUMENTS

| | | |
|---|---|---|
| EP | 3378996 A1 | 9/2018 |
| WO | 2018/008504 A1 | 1/2018 |
| WO | 2018/025512 A1 | 2/2018 |

OTHER PUBLICATIONS

International Search Report and Written Opinion dated Dec. 9, 2019 for International Application No. PCT/US2019/045316 filed Aug. 6, 2019, 14 pages.

*Primary Examiner* — Russell Frejd
(74) *Attorney, Agent, or Firm* — John Veldhuis-Kroeze; Westman, Champlin & Koehler, P.A.

(57) ABSTRACT

Disclosed embodiments include power machines such as loaders, and systems used on power machines, configured to detect the presence of an object in a zone adjacent the rear or sides of the power machine and to responsively control the power machine to stop or slow work functions.

19 Claims, 8 Drawing Sheets

(56) References Cited

U.S. PATENT DOCUMENTS

| | | | |
|---|---|---|---|
| 2013/0000092 A1* | 1/2013 | Hukkeri | G05D 1/021 |
| | | | 29/402.01 |
| 2015/0198951 A1* | 7/2015 | Thor | B60W 10/22 |
| | | | 701/23 |
| 2016/0252610 A1* | 9/2016 | Smith | G01S 13/04 |
| | | | 342/27 |

* cited by examiner

OBJECT DETECTION EXTERNAL TO VEHICLE

CROSS-REFERENCE TO RELATED APPLICATION

This application claims the benefit of U.S. Provisional Application No. 62/715,017, which was filed on Aug. 6, 2018.

BACKGROUND

This disclosure is directed toward power machines. More particularly, this disclosure is directed toward power machines, such as compact loaders, having object detection and machine control systems that effect machine control in the presence of a detected object and provide a visual warning.

Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Loaders can be used to perform a variety of tasks using travel, lift, tilt and auxiliary functions. Commonly, loaders are used to transport material and/or to perform a variety of tasks with attached implements. When operating a loader to perform a task, one or more persons, animals, vehicles or other objects may approach the work area in close proximity to the power machine.

The discussion above is merely provided for general background information and is not intended to be used as an aid in determining the scope of the claimed subject matter.

SUMMARY

Disclosed embodiments include power machines such as loaders, and systems used on power machines, that are configured to detect the presence of an object in a zone adjacent the rear or sides of the power machine and to responsively control the power machine to stop or slow work functions. Some disclosed embodiments also illuminate a zone or a portion of a zone in which an object can be been detected.

Disclosed embodiments include power machines and methods of providing controlling power machines in work areas having obstacles. A system of one or more controllers or computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a power machine (100, 200, 400) including: a power system (120, 220, 320) having: a power source (222, 322), a power conversion system (224, 324) driven by the power source, a traction system including left and right drive motors (326a, 326b) coupled to and receiving power through the power conversion system to implement travel functions and move the power machine, and work actuators (238, 235) coupled to and receiving power through the power conversion system to implement work functions. The power machine also includes user inputs (350) actuable by an operator of the power machine and configured to responsively provide user input signals to control the work and travel functions of the power machine. The power machine also includes at least one object detection sensor (352) configured to detect a presence of an object (402; 406) within one or more monitored zones (404; 408; 410) surrounding the power machine and to responsively provide object detection signals indicative of detection of the presence of the object. The power machine also includes a zone illumination system (354) configured to illuminate all or part of any of the monitored zones in which the presence of the object was detected. The power machine further includes a controller (302) coupled to the user inputs, the at least one object detection sensor, the zone illumination system, and the power conversion system, the controller configured to receive the user input signals and the object detection signals and to responsively control the power conversion system to control the traction system and work actuators and thereby control work and travel functions of the power machine, where upon detection of the object within the one or more monitored zones the controller controls the zone illumination system to illuminate all or part of the monitored zones in which the presence of the object was detected. Other embodiments of this aspect include corresponding computer systems, apparatus, and computer programs recorded on one or more computer storage devices, each configured to perform the actions of the methods.

Implementations may include one or more of the following features. The power machine where the controller is further configured such that, upon detection of the object within the one or more monitored zones, the controller controls the power conversion system (324) to slow or stop performance of at least one of the travel functions and the work functions using the traction system and the work actuators, altering normal control responsive to the user input signals. The power machine where the controller is configured such that, upon detection of the object within the one or more monitored zones, the controller controls the power conversion system (324) to slow or stop the travel functions of the power machine using the traction system, despite user input signals commanding travel, to prevent a collision with the object. The power machine where the controller is configured such that, upon detection of the object within the one or more monitored zones, the controller controls the power conversion system (324) to allow at least some work functions using the work actuators.

The power machine where the power conversion system includes left and right drive pumps (324a; 324b) driven by the power source and coupled, respectively, to the left and right drive motors (326a; 326b). The power machine where the power conversion system includes: an implement pump (324c) driven by the power source; and a control valve (340) receiving pressurized hydraulic fluid from the implement pump and selectively providing the pressurized fluid to the work actuators. The power machine and further including: a frame (110; 210); a lift arm assembly (230) pivotally coupled to the frame; an implement carrier (272) pivotally coupled to the lift arm assembly; where the work actuators include a lift actuator (238), coupled between the frame and the lift arm assembly and configured to raise and lower the lift arm assembly, and a tilt actuator (235) pivotally coupled between the lift arm assembly and the implement carrier and configured to rotate the implement carrier relative to the lift arm assembly.

The power machine where the controller controls the zone illumination system to illuminate all or part of the monitored zones in which the presence of the object was detected by illuminating a portion of ground within the monitored zones in which the presence of the object was detected. The power machine where the controller controls the zone illumination system to illuminate all or part of the monitored zones in which the presence of the object was detected by illuminating a boundary of the monitored zones in which the presence of the object was detected. The power machine where the controller controls the zone illumination system to illuminate all or part of the monitored zones in which the presence of the object was detected by illuminating the detected object.

One general aspect includes a power machine (100, 200, 400) including: a power system (120, 220, 320) including: a power source (222, 322), a power conversion system (224, 324) driven by the power source, a traction system including left and right drive motors (326a, 326b) coupled to and receiving power through the power conversion system to implement travel functions and move the power machine, and work actuators (238, 235) coupled to and receiving power through the power conversion system to implement work functions. The power machine also includes user inputs (350) actuable by an operator of the power machine and configured to responsively provide user input signals to control the work and travel functions of the power machine. The power machine also includes at least one object detection sensor (352) configured to detect a presence of an object (402; 406) within one or more monitored zones (404; 408; 410) surrounding the power machine and to responsively provide object detection signals indicative of detection of the presence of the object. The power machine also includes a controller (302) coupled to the user inputs, the at least one object detection sensor, and the power conversion system, the controller configured to receive the user input signals and the object detection signals and to responsively control the power conversion system to control the traction system and work actuators and thereby control work and travel functions of the power machine, where upon detection of the object within the one or more monitored zones the controller controls the power conversion system to slow or stop performance of at least one of the travel functions and the work functions using the traction system and the work actuators, altering normal control responsive to the user input signals. Other embodiments of this aspect include corresponding computer systems, apparatus, and computer programs recorded on one or more computer storage devices, each configured to perform the actions of the methods.

Implementations may include one or more of the following features. The power machine where the controller is configured such that, upon detection of the object within the one or more monitored zones, the controller controls the power conversion system (324) to slow or stop the travel functions of the power machine using the traction system, despite user input signals commanding travel, to prevent a collision with the object. The power machine where the controller is configured such that, upon detection of the object within the one or more monitored zones, the controller controls the power conversion system (324) to allow at least some work functions using the work actuators.

The power machine where the power conversion system includes left and right drive pumps (324a; 324b) driven by the power source and coupled, respectively, to the left and right drive motors (326a; 326b). The power machine where the power conversion system includes: an implement pump (324c) driven by the power source; and a control valve (340) receiving pressurized hydraulic fluid from the implement pump and selectively providing the pressurized fluid to the work actuators. The power machine and further including: a frame (110; 210); a lift arm assembly (230) pivotally coupled to the frame; an implement carrier (272) pivotally coupled to the lift arm assembly; where the work actuators include a lift actuator (238), coupled between the frame and the lift arm assembly and configured to raise and lower the lift arm assembly, and a tilt actuator (235) pivotally coupled between the lift arm assembly and the implement carrier and configured to rotate the implement carrier relative to the lift arm assembly.

The power machine and further including a zone illumination system (354) coupled to the controller and configured to illuminate all or part of any of the monitored zones in which the presence of the object was detected, where upon detection of the object within the one or more monitored zones the controller controls the zone illumination system to illuminate all or part of the monitored zones in which the presence of the object was detected. The power conversion system where the controller controls the zone illumination system to illuminate all or part of the monitored zones in which the presence of the object was detected by illuminating a portion of ground within the monitored zones in which the presence of the object was detected. The power machine where the controller controls the zone illumination system to illuminate all or part of the monitored zones in which the presence of the object was detected by illuminating a boundary of the monitored zones in which the presence of the object was detected. The power machine where the controller controls the zone illumination system to illuminate all or part of the monitored zones in which the presence of the object was detected by illuminating the detected object.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

FIGS. 7-1 through 7-3 are diagrammatic top view illustrations of a power machine with the system of FIG. 6, showing monitored zones adjacent the power machine.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments include power machines such as loaders, and systems used on such power machines that are configured to detect objects within one or more zones on the sides and/or rear of the machine and to responsively limit or stop operations of the power machine. For example, upon the detection of an object within or approaching a zone to the sides or rear of the power machine, the travel, lift and/or other functions of the power machine can be slowed or stopped. In some disclosed embodiments, an illumination of the zone or other visual indication is implemented by the power machine. For example, in some embodiments a laser traces a boundary of the zone, or other light sources are used to illuminate the zone.

Figure 2:
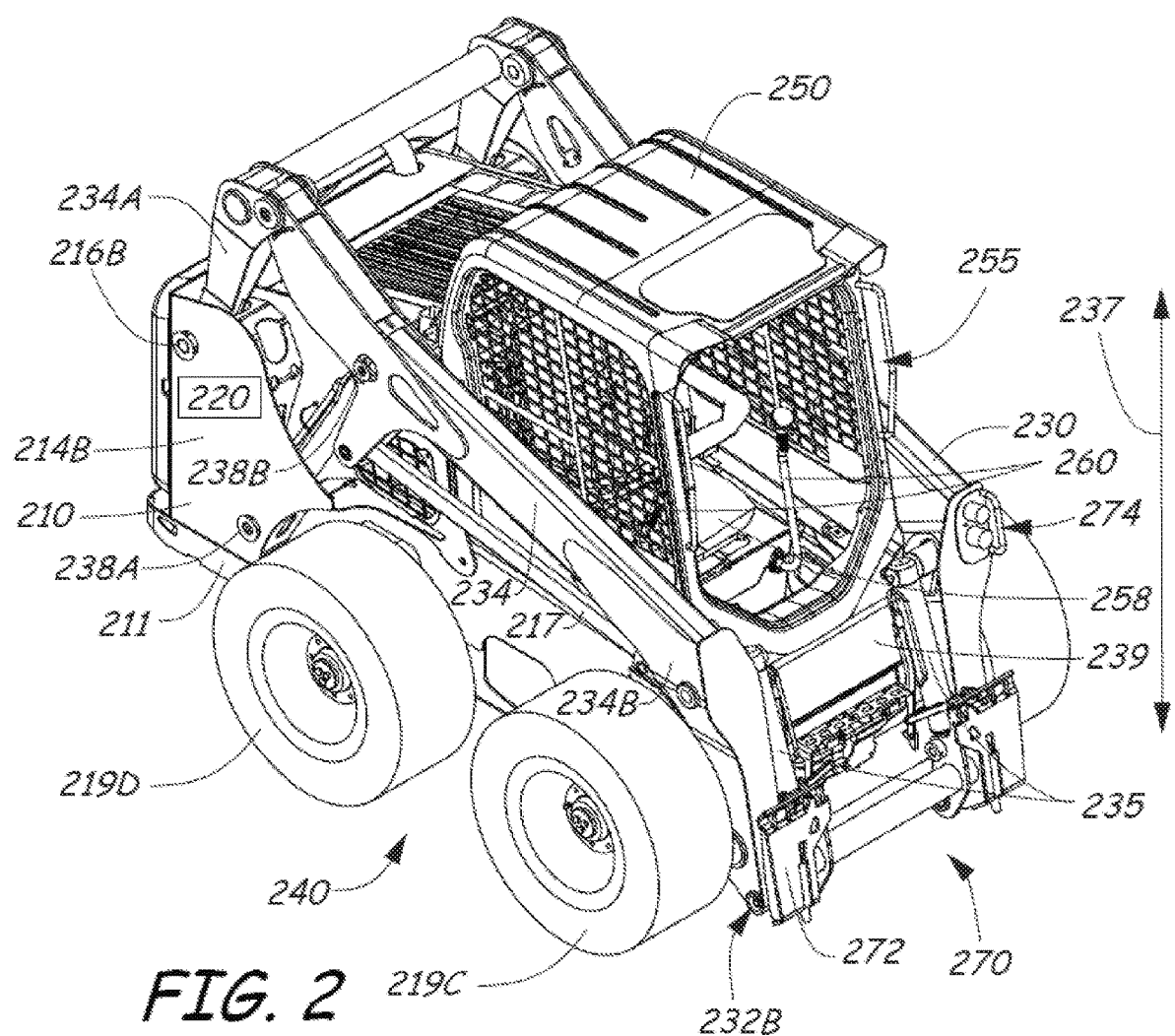
FIGS. 2-3 illustrate perspective views of a representative power machine in the form of a skid-steer loader of the type on which the disclosed embodiments can be practiced.
Figure 3:
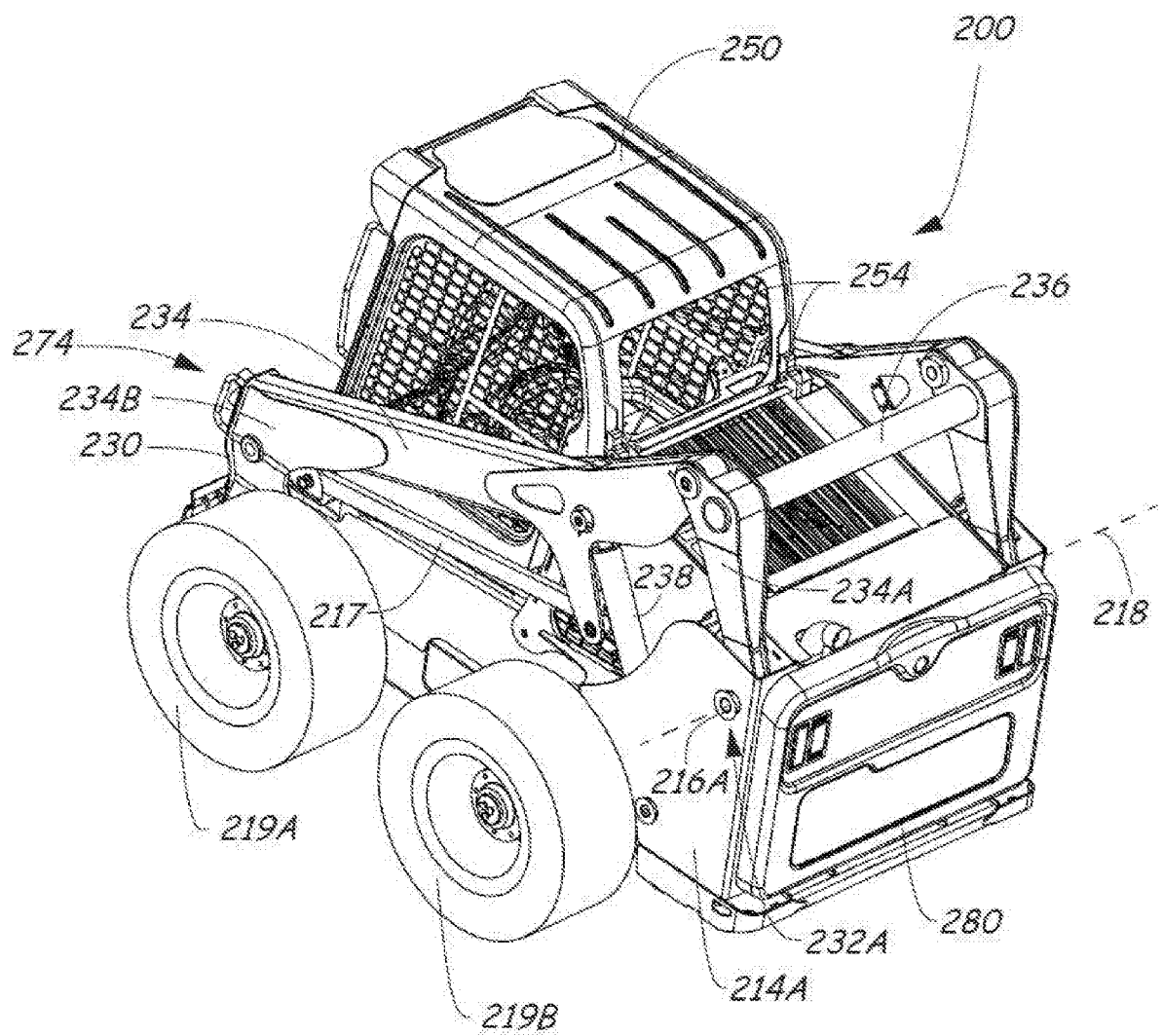

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
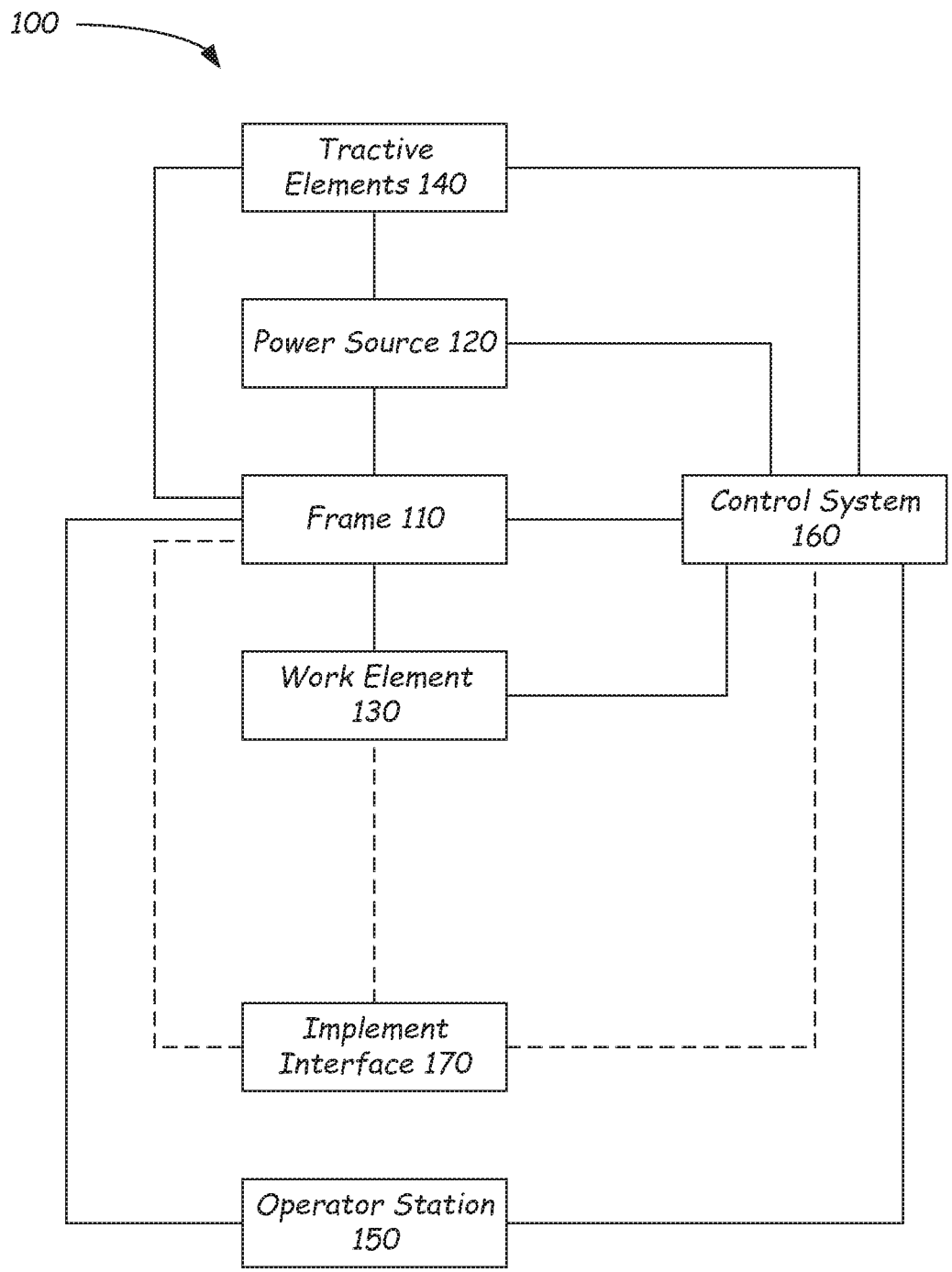
FIG. 1 is a block diagram illustrating functional systems of a representative power machine on which embodiments of the present disclosure can be advantageously practiced.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and is capable of performing various work tasks. As loader 200 is a work vehicle, frame 210 also supports a traction system 240, which is also powered by power system 220 and is capable of propelling the power machine over a support surface. The lift arm assembly 230 in turn supports an implement interface 270, which includes an implement carrier 272 that is capable of receiving and securing various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that are capable of including and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
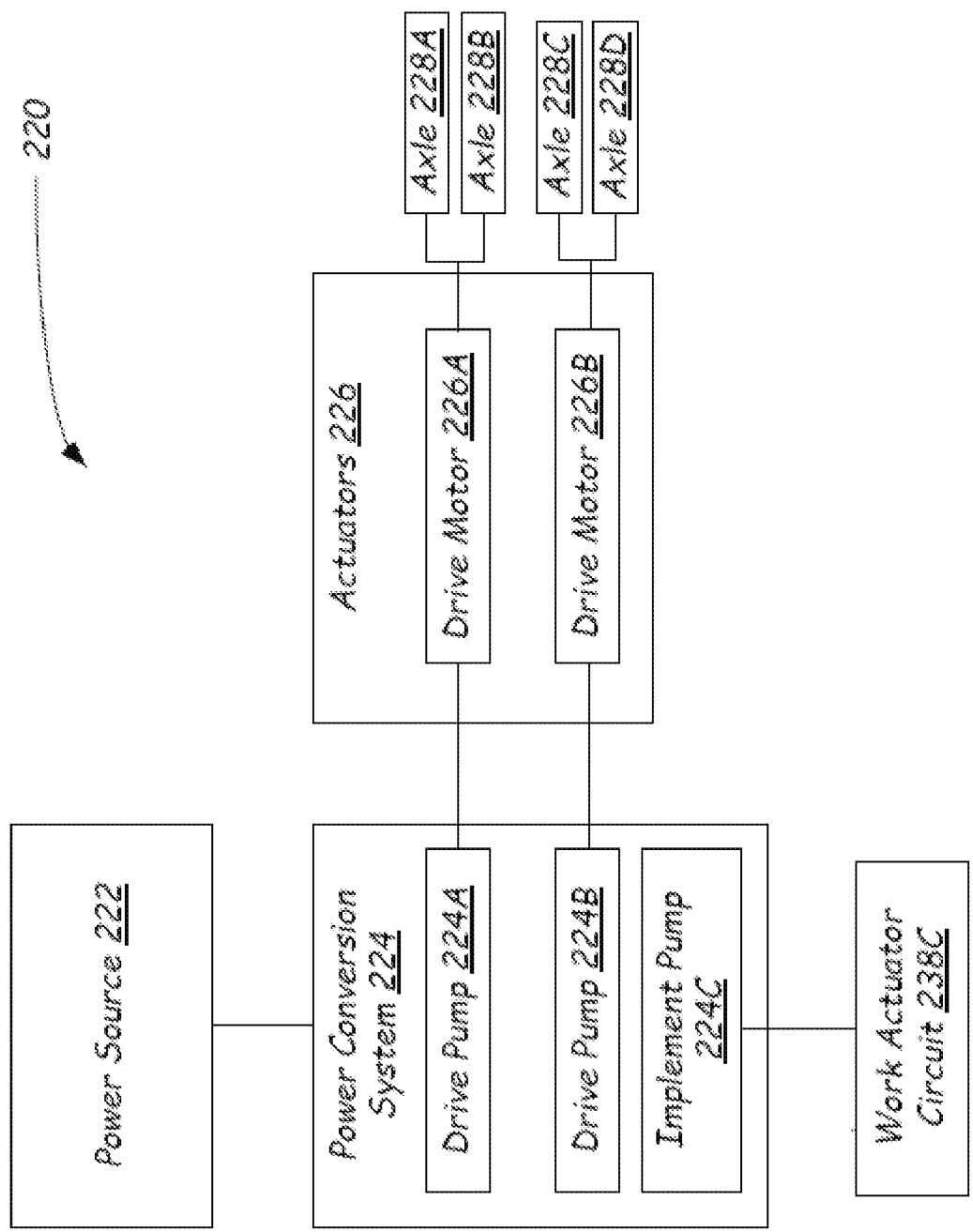
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220 that are controlled responsive to detection of an object in embodiments as described below. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that are capable of providing power for given power machine components. The power system 220 also includes a power conversion system 224, which is operably coupled to the power source 222. Power conversion system 224 is, in turn, coupled to one or more actuators 226, which are capable of performing a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements such as wheels 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic (such as one or more valves) to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as loader 200, unless otherwise noted or recited, the concepts discussed below are not intended to be limited in their application to the environments specifically described above.

Figure 5:
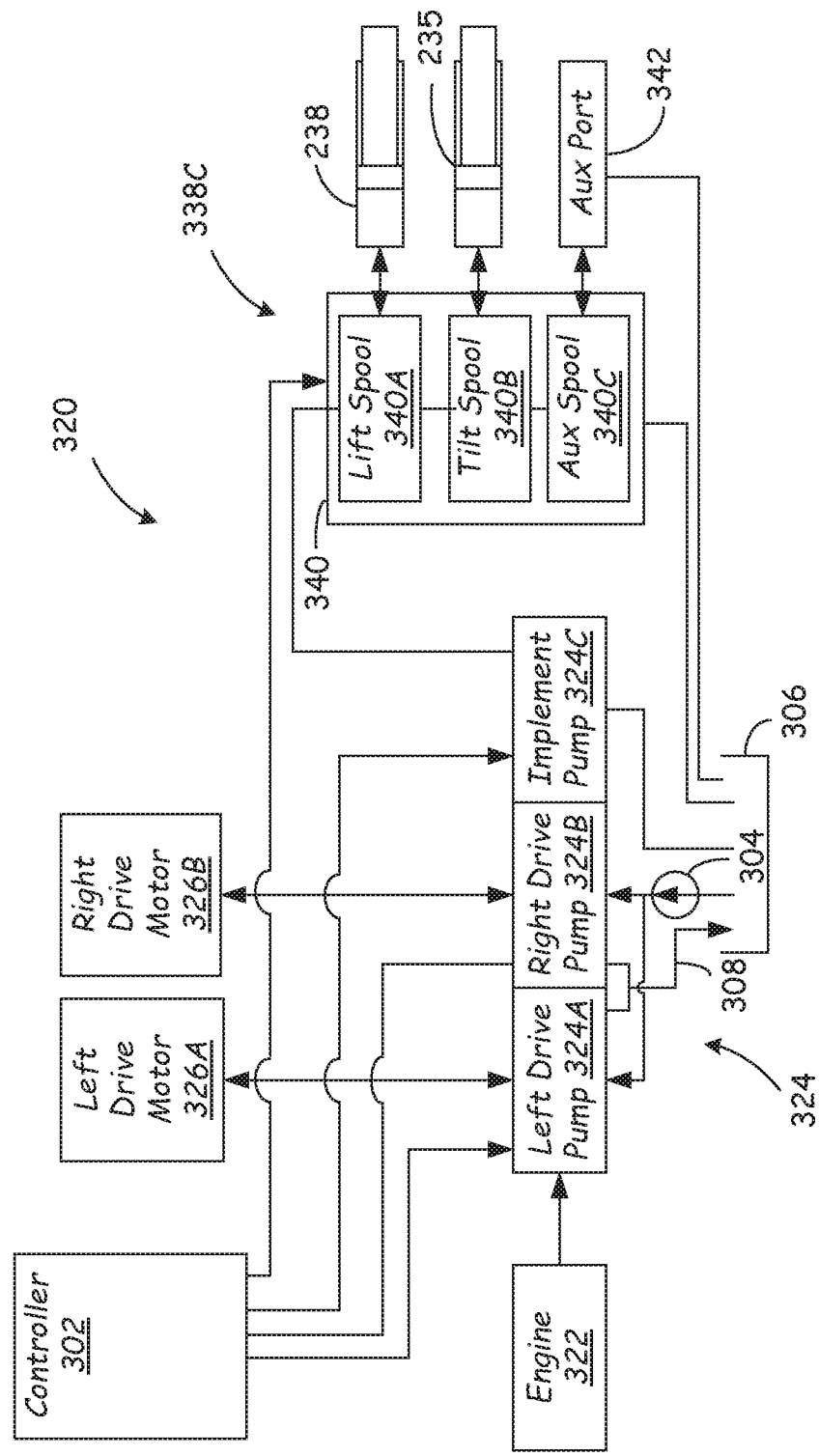
FIG. 5 is a block diagram illustrating the components of the power system of FIG. 4 in greater detail in accordance with an example embodiment.

Referring now to FIG. 5, shown is a diagram of a power system 320, which is one more particular embodiment of power system 220 discussed with reference to FIG. 4, and which is controlled responsive to detection of an object within a zone around the power machine. Power system 320 can by employed on machines such as loader 200. As shown in FIG. 5, power source 322, corresponding to power source 222 in FIG. 4, is an engine, typically a diesel engine, though disclosed embodiments are not limited to this particular type of power source. Like power system 220, power system 320 includes power conversion system 324 having a pair of drive pumps, left drive pump 324A and right drive pump 324B in a pump package, and an implement pump 324C. The engine 322 can directly drive the pumps, can indirectly drive the pumps through a belt driven coupling mechanism, or can drive the pumps using any other type of coupling. Power conversion system 324 can also include a charge pump 304 which pumps hydraulic fluid from tank 306 to charge the inputs to drive pumps 324A and 324B.

Implement pump 324C can be, in some embodiments, a constant displacement gear pump which provides a constant displacement of pressurized hydraulic fluid to a control valve 340 of a work actuator circuit 338C, corresponding to work actuator circuit 238C shown in FIG. 4. The control valve 340 is an open center parallel valve that has three spools, a lift spool 340A providing hydraulic fluid to the lift actuator(s) 238, a tilt spool 340B providing hydraulic fluid to the tilt actuator(s) 235, and an auxiliary hydraulic spool 340C providing hydraulic fluid through an auxiliary port 342 to auxiliary functions such as those of work actuators located on an attached implement. The hydraulic spools have priority in the receipt of the constant supply of hydraulic fluid in the order shown (e.g., the lift spool has priority over the tilt and auxiliary spools, and the tilt spool has priority over the auxiliary spool). A controller 302 controls the positions of the spools of control valve 340, for example using solenoids. Hydraulic fluid passing through the various spools, and corresponding actuators (e.g., lift actuator(s) 238, tilt actuator(s) 235, etc.) when the spools are energized by controller 302, exits the control valve 340 and is returned to tank 306. Alternatively, implement pump 324C can be a variable displacement pump without departing from the scope of any embodiment in this discussion.

In exemplary embodiments, the drive system of power system 320 is a hydrostatic system. Each drive pump 324A and 324B is coupled to one or more motors. In a skid steer loader, each drive pump is a variable displacement pump coupled to one motor with left drive pump 324A providing hydraulic fluid to left drive motor 326A and right drive pump 324B providing hydraulic fluid to right drive motor 326B. The displacement of each of pumps 324A and 324B is controlled by controls signals from controller 302, and the displacement can be controlled in either direction to control forward and rearward movement of the power machine. Motors 326A and 326B can be constant displacement motors. Further, motors 326A and 326B can be multiple speed motors, having two or more speeds which can be shifted into, with different constant displacements in each speed. The hydraulic circuits between drive pump 324A and drive motor 326A, and between drive pump 324B and drive motor 326B can be closed loops circuits. Typically, there will be some leakage of hydraulic fluid in the pumps, and a case drain line 308 provides hydraulic fluid leaking from the pumps back to tank 306. This hydraulic fluid leakage can also be provided through a cooler (not shown) before returning to tank 306 for purposes of cooling the hydraulic fluid in the system. When controlling drive functions of the power machine, controller 302 provides electronic signals to stroke the two drive pumps 324A and 324B independently of each other to cause hydraulic fluid to be provided to the hydraulic drive motors 326A and 326B. In some embodiments, controller 302 also provides electronic signals to control the displacement speeds of the motors 326A and 326B, which are typically two-speed motors.

Disclosed embodiments include loaders or other power machines, and systems used on power machines that are configured to detect the presence of an object in one or more zones to the sides or rear of the machine, and to responsively control operation of the machine to slow or stop travel and/or work functions. Controller 302 is configured, in some embodiments, to provide or aid in such control as is described below. For example, controller 302 can control the drive or implement pumps of the power conversion system 324, the control valve 340, or optionally the engine 322, responsive to various inputs, including detection of an object in the one or more zones.

Figure 6:
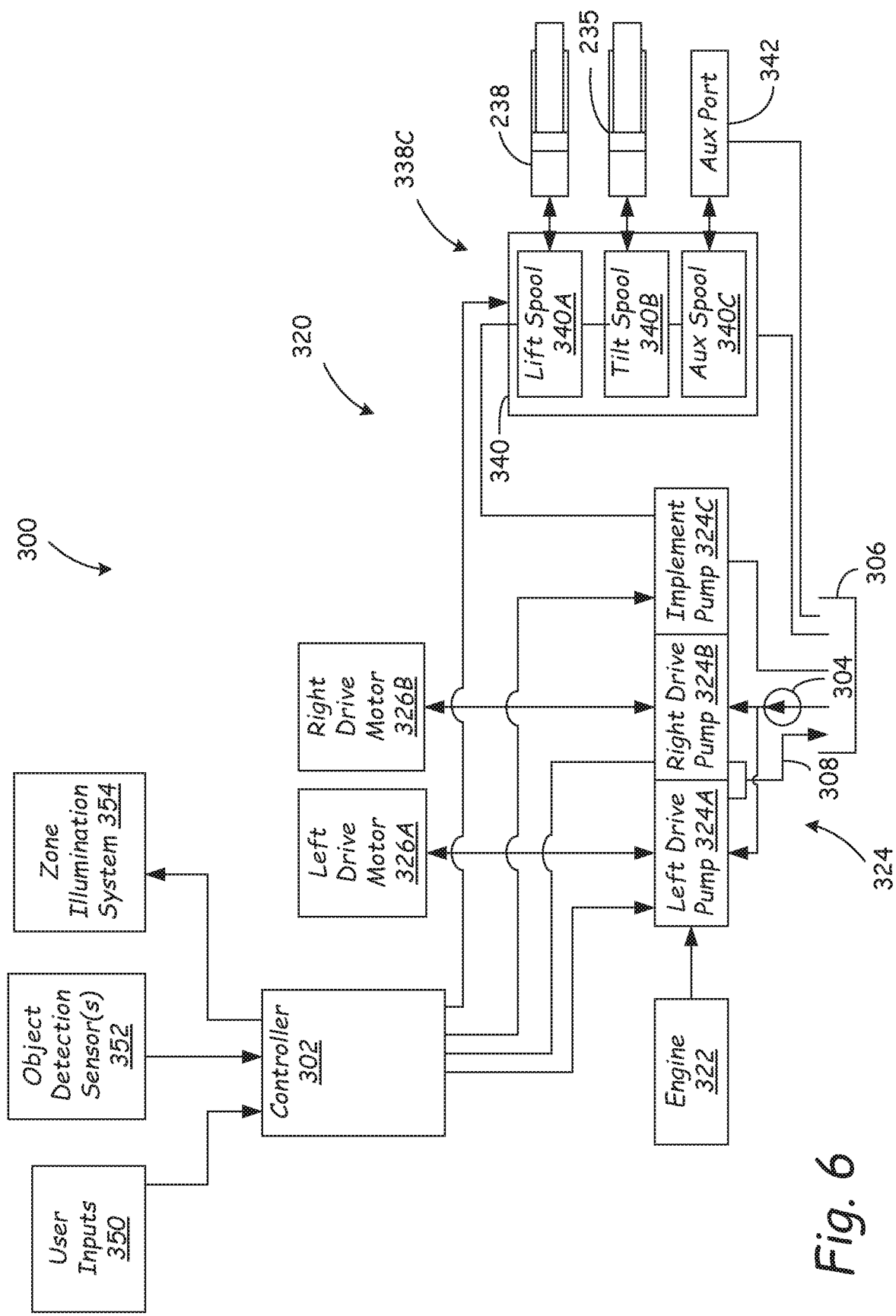
FIG. 6 is a block diagram of a system configured to detect the presence of an object in a zone adjacent a power machine and to responsively control the travel and/or work functions of the power machine.

FIG. 6 illustrates system 300 that can be employed on power machines such as loader 200 according to some embodiments. The system 300 includes power system 320 and components configured to define and illuminate a zone in which objects can be detected and, if an object is detected, provide control over the power system in response to the objection. Controller 302 is configured to control the power conversion system 324, the control valve 340, or optionally the engine 322 in response to signals from user inputs 350. Examples of user inputs 350 include joystick controllers, levers, foot pedals, touch screen inputs, switches, etc., though other user inputs can be utilized as well. Under normal operation, responsive to input signals from user inputs 350, controller 302 controls the power conversion system 324, the control valve 340, etc., to perform work functions, such as causing the machine to travel, raising and lowering of a lift arm, controlling a tilt actuator to control positioning of an implement, and/or controlling auxiliary functions on the implement.

Figures 1, 7:
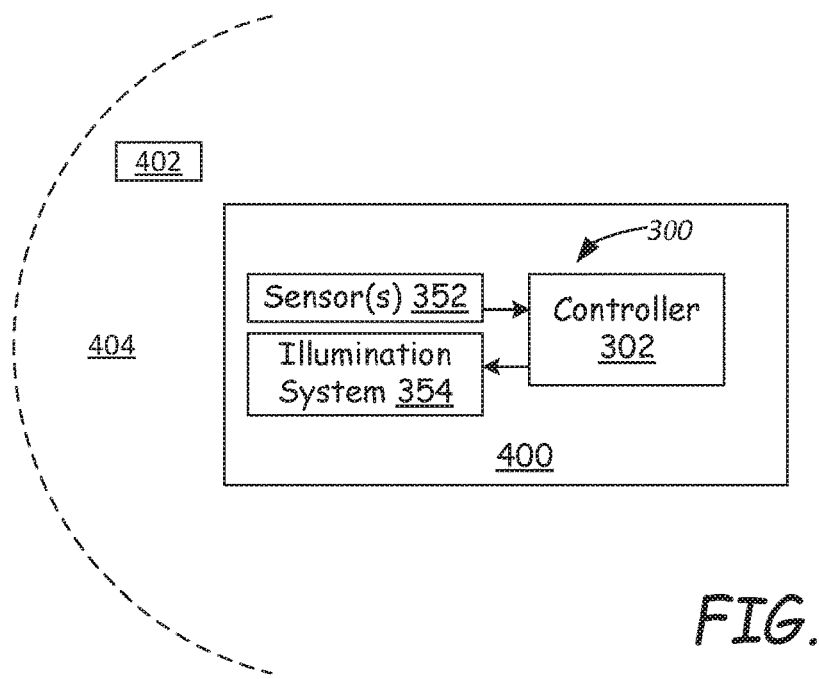
Figures 2, 7:
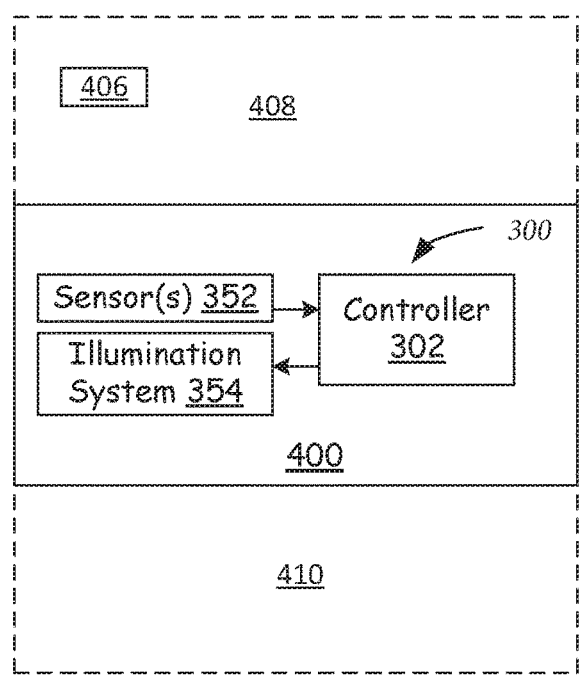
Figures 3, 7:
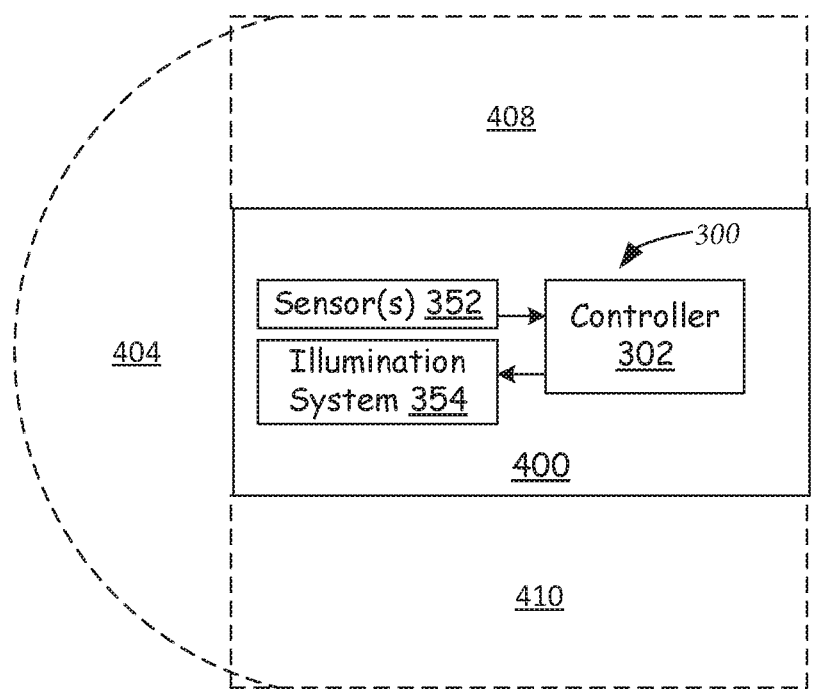

System 300 also includes one or more object detection sensors 352 configured to detect the presence of an object within one or more zones surrounding the power machine. FIG. 7-1 is a diagrammatic top view illustration of a power machine 400 including system 300 in which sensor(s) 352 detect the presence of an object 402 within a zone 404 to the rear and rearward sides of the machine. FIG. 7-2 is a diagrammatic top view illustration of power machine 400 in which sensor(s) 352 detect the presence of an object 406 within one of zones 408 and 410 to the sides of the machine. FIG. 7-3 is a diagrammatic top view illustration of power machine 400 in which sensor(s) 352 monitor all of zones 404, 408 and 410 for the presence of an object. The size, shape, number, and locations of the monitored zones can vary and is not intended to be limited to the shape or locations of the zones shown in FIGS. 7-1 through 7-3. Further, the size of the zones can vary as desired. For example, in some embodiments, the zones include all areas to the sides and rear of the power machine within 10 feet of the machine. Other sized zones can be used in other embodiments. Object detection sensor(s) 352 can include any type of sensors, or combinations of types of sensors, which can be used to detect an object such as a human or animal, a vehicle, etc. For instance, sensor(s) 352 can include radar or low power radar sensors, laser sensors, optical sensors or cameras with image processing circuitry for object recognition, infrared sensors, motion sensors, etc.

Upon detection of an object (e.g., objects 402 or 406 shown in FIGS. 7-1 and 7-2) in a monitored zone adjacent to power machine 400, controller 302 controls the power conversion system 324, the control valve 340, etc., to slow or stop the performance of work functions, overriding or altering normal control (e.g., responsive to user input signals when an object has not been detected). In some embodiments, the travel or work group functions are halted altogether, despite the commands from the user inputs 350. In other embodiments, the functions are merely slowed. In still other embodiments, certain functions are stopped, while others are slowed. For instance, travel functions may be stopped entirely to prevent a collision with the object, despite user input commands to travel, while lift arm or auxiliary functions are allowed to continue, responsive to the user inputs, but with slower or reduced power movements.

Figure 8:
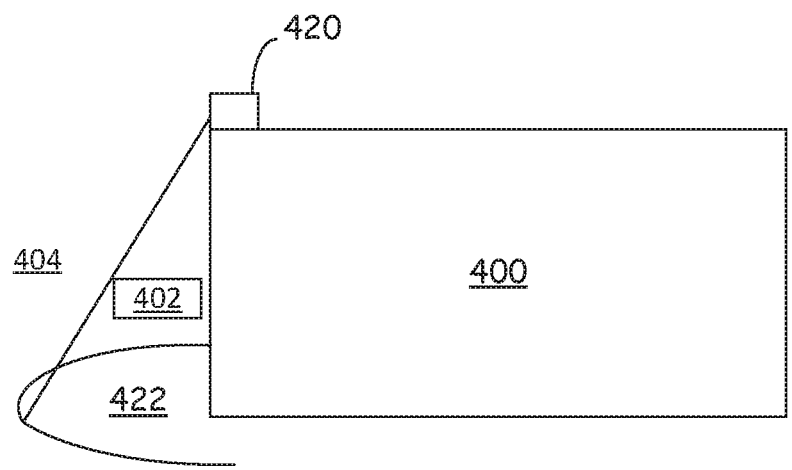
FIG. 8 is a diagrammatic side view illustration of the power machine shown in FIGS. 7-1 through 7-3, showing a zone illumination system illuminating a zone in which an object has been detected.

System 300 also includes a zone illumination system 354, controllable by the controller 302, configured to illuminate all or part of a monitored zone upon detection of an object. For instance, referring to the diagrammatic side view power machine illustration of FIG. 8, upon detection of an object 402 within zone 404 to the rear of the power machine, a light source 420 of zone illumination system 354 illuminates a portion 422 of the ground within zone 404. The zone illumination system 354 and light source 420 can be configured to illuminate an entire zone, to illuminate a portion of a zone, or to illuminate a boundary of the zone or a portion of the zone. For instance, the light source can be an LED array (or other type of light source) which is directed to illuminate an entire zone where an object was detected. In the alternative, the light source can be a tracing laser configured to illuminate a boundary around the zone or the object within the zone. By providing the illumination with system 354, the operator of the power machine can more easily visually identify the object. Also, illumination of the zone or portion of the zone can provide a visual indication to a person outside of the power machine of the zone surrounding the machine.

Although the present invention has been described with reference to preferred embodiments, workers skilled in the art will recognize that changes may be made in form and detail without departing from the scope of the discussion.

What is claimed is:

1. A power machine comprising:
   a power system including a power source, a power conversion system driven by the power source, a traction system coupled to and receiving power from the power conversion system to implement travel functions and move the power machine, and work actuators coupled to and receiving power through the power conversion system to implement work functions;
   user inputs actuable by an operator of the power machine and configured to responsively provide user input signals to control the travel functions of the power machine;
   at least one object detection sensor configured to detect a presence of an object within one or more monitored zones surrounding the power machine and to responsively provide object detection signals indicative of detection of the presence of the object;
   a zone illumination system configured to illuminate a boundary of any of the monitored zones in which the presence of the object was detected; and
   a controller coupled to the user inputs, the at least one object detection sensor, the zone illumination system, and the power conversion system, the controller configured to receive the user input signals and the object detection signals and to responsively control the power conversion system to control the traction system, wherein upon detection of the object within the one or more monitored zones the controller controls the zone illumination system to illuminate the boundary of any of the monitored zones in which the presence of the object was detected.

2. The power machine of claim 1, wherein the controller is further configured such that, upon detection of the object within the one or more monitored zones, the controller controls the power conversion system to slow or stop performance of the travel function.

3. The power machine of claim 2, wherein the controller is configured such that, upon detection of the object within the one or more monitored zones, the controller controls the power conversion system to slow or stop the travel functions of the power machine using the traction system, despite user input signals commanding travel, to prevent a collision with the object.

4. The power machine of claim 3, wherein the controller is configured such that, upon detection of the object within the one or more monitored zones, the controller controls the power conversion system to allow at least some work functions using the work actuators.

5. The power machine of claim 1, wherein the power conversion system includes left and right drive pumps driven by the power source and coupled, respectively, to the left and right drive motors.

6. The power machine of claim 5, wherein the power conversion system includes:
   an implement pump driven by the power source; and
   a control valve receiving pressurized hydraulic fluid from the implement pump and selectively providing the pressurized fluid to the work actuators.

7. The power machine of claim 6, and further comprising:
   a frame;
   a lift arm assembly pivotally coupled to the frame;
   an implement carrier pivotally coupled to the lift arm assembly;
   wherein the work actuators include a lift actuator, coupled between the frame and the lift arm assembly and configured to raise and lower the lift arm assembly, and a tilt actuator pivotally coupled between the lift arm assembly and the implement carrier and configured to rotate the implement carrier relative to the lift arm assembly.

8. The power machine of claim 1, wherein the controller controls the zone illumination system to illuminate all or part of the monitored zones in which the presence of the object was detected by illuminating a portion of ground within the monitored zones in which the presence of the object was detected.

9. The power machine of claim 1, wherein the controller controls the zone illumination system to illuminate the boundary of any of the monitored zones in which the presence of the object was detected by using a laser to trace the boundary of any of the monitored zones in which the presence of the object was detected.

10. The power machine of claim 1, wherein the controller controls the zone illumination system to illuminate all or part of the monitored zones in which the presence of the object was detected by illuminating the detected object.

11. A power machine comprising:
a power system comprising:
- a power source, a power conversion system driven by the power source, a traction system including left and right drive motors coupled to and receiving power through the power conversion system to implement travel functions and move the power machine, and work actuators coupled to and receiving power through the power conversion system to implement work functions;
- user inputs actuable by an operator of the power machine and configured to responsively provide user input signals to control the work and travel functions of the power machine;
- at least one object detection sensor configured to detect a presence of an object within one or more monitored zones surrounding the power machine and to responsively provide object detection signals indicative of detection of the presence of the object;
- a controller coupled to the user inputs, the at least one object detection sensor, and the power conversion system, the controller configured to receive the user input signals and the object detection signals and to responsively control the power conversion system to control the traction system and work actuators and thereby control work and travel functions of the power machine, wherein upon detection of the object within the one or more monitored zones the controller controls the power conversion system to slow or stop performance of at least one of the travel functions and the work functions using the traction system and the work actuators, altering normal control responsive to the user input signals;
- a zone illumination system coupled to the controller and configured to illuminate all or part of any of the monitored zones in which the presence of the object was detected, wherein upon detection of the object within the one or more monitored zones the controller controls the zone illumination system to illuminate a boundary of the monitored zones in which the presence of the object was detected.

12. The power machine of claim 11, wherein the controller is configured such that, upon detection of the object within the one or more monitored zones, the controller controls the power conversion system to slow or stop the travel functions of the power machine using the traction system, despite user input signals commanding travel, to prevent a collision with the object.

13. The power machine of claim 12, wherein the controller is configured such that, upon detection of the object within the one or more monitored zones, the controller controls the power conversion system to allow at least some work functions using the work actuators.

14. The power machine of claim 11, wherein the power conversion system includes left and right drive pumps driven by the power source and coupled, respectively, to the left and right drive motors.

15. The power machine of claim 14, wherein the power conversion system includes:
- an implement pump driven by the power source; and
- a control valve receiving pressurized hydraulic fluid from the implement pump and selectively providing the pressurized fluid to the work actuators.

16. The power machine of claim 15, and further comprising:
- a frame;
- a lift arm assembly pivotally coupled to the frame;
- an implement carrier pivotally coupled to the lift arm assembly;
- wherein the work actuators include a lift actuator, coupled between the frame and the lift arm assembly and configured to raise and lower the lift arm assembly, and a tilt actuator pivotally coupled between the lift arm assembly and the implement carrier and configured to rotate the implement carrier relative to the lift arm assembly.

17. The power conversion system of claim 11, wherein the controller controls the zone illumination system to illuminate all or part of the monitored zones in which the presence of the object was detected by illuminating a portion of ground within the monitored zones in which the presence of the object was detected.

18. The power machine of claim 11, wherein the controller controls the zone illumination system to illuminate all or part of the monitored zones in which the presence of the object was detected by illuminating the detected object.

19. The power machine of claim 11, wherein the zone illumination system includes a laser, and wherein the controller controls the laser of the zone illumination system to illuminate the boundary of the monitored zones in which the presence of the object was detected.

* * * * *